United States Patent
Gupta et al.

(10) Patent No.: US 12,158,073 B2
(45) Date of Patent: Dec. 3, 2024

(54) VARIABLE GEOMETRY TURBINE AND TURBOCHARGER

(71) Applicant: MITSUBISHI HEAVY INDUSTRIES ENGINE & TURBOCHARGER, LTD., Sagamihara (JP)

(72) Inventors: Bipin Gupta, Tokyo (JP); Toyotaka Yoshida, Tokyo (JP); Yuya Nakahara, Tokyo (JP); Yosuke Dammoto, Sagamihara (JP); Youji Akiyama, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/272,700

(22) PCT Filed: Dec. 13, 2021

(86) PCT No.: PCT/JP2021/045835
§ 371 (c)(1),
(2) Date: Jul. 17, 2023

(87) PCT Pub. No.: WO2022/158167
PCT Pub. Date: Jul. 28, 2022

(65) Prior Publication Data
US 2024/0076996 A1 Mar. 7, 2024

(30) Foreign Application Priority Data
Jan. 21, 2021 (JP) .................. 2021-008190

(51) Int. Cl.
*F01D 17/16* (2006.01)
*F01D 25/24* (2006.01)
*F02B 37/22* (2006.01)

(52) U.S. Cl.
CPC .......... *F01D 17/165* (2013.01); *F01D 25/24* (2013.01); *F02B 37/22* (2013.01)

(58) Field of Classification Search
CPC ...... F01D 17/16; F01D 17/165; F01D 17/143; F01D 17/141; F01D 17/14; F01D 5/14;
(Continued)

(56) References Cited

U.S. PATENT DOCUMENTS 4,355,953 A * 10/1982 Nelson ................. F03B 3/183
415/164
2005/0260067 A1 11/2005 Parker et al.
(Continued)

FOREIGN PATENT DOCUMENTS

JP  2005-299660 A  10/2005
JP  2011-106276 A  6/2011
(Continued)

OTHER PUBLICATIONS

International Preliminary Report on Patentability and English translation of the Written Opinion of the International Searching Authority dated Aug. 3, 2023 for Application No. PCT/JP2021/045835.
(Continued)

*Primary Examiner* — Woody A Lee, Jr.
*Assistant Examiner* — Cameron A Corday
(74) *Attorney, Agent, or Firm* — Birch, Stewart, Kolasch & Birch, LLP

(57) ABSTRACT

A variable geometry turbine includes: a turbine rotor; a scroll passage forming part which forms a scroll passage; an exhaust gas passage forming part which forms an exhaust gas passage for introducing an exhaust gas from the scroll passage to the turbine rotor; and a variable nozzle unit including a plurality of nozzle vanes disposed in the exhaust gas passage and configured to be rotatable about respective rotation centers. The exhaust gas passage forming part
(Continued)

includes: a first plate member having an annular first plate part; and a second plate member having an annular second plate part which defines the exhaust gas passage between the first plate part and the second plate part and is disposed closer to a turbine outlet than the first plate part in an axial direction of the turbine rotor. The first plate member has, in a hub-side passage surface of the first plate part facing the exhaust gas passage, at least one groove portion extending from an inner peripheral edge of the first plate part toward an outer peripheral side.

11 Claims, 12 Drawing Sheets

(58) Field of Classification Search
CPC .......... F01D 5/141; F01D 5/143; F01D 25/24; F02B 37/24; F05D 2210/30; F05D 2240/12; F05D 2220/40
See application file for complete search history.

(56) References Cited

U.S. PATENT DOCUMENTS

| 2014/0360160 A1* | 12/2014 | Sun | F02B 37/22 |
| | | | 60/273 |
| 2015/0369073 A1* | 12/2015 | Japikse | F04D 29/685 |
| | | | 703/2 |
| 2016/0146100 A1 | 5/2016 | Sun et al. | |
| 2018/0149078 A1* | 5/2018 | Sakamoto | F01D 17/165 |

FOREIGN PATENT DOCUMENTS

| JP | 2018-53800 A | 4/2018 |
| JP | 2019-167844 A | 10/2019 |
| JP | 2020-165374 A | 10/2020 |

OTHER PUBLICATIONS

International Search Report and Written Opinion of the International Searching Authority dated Feb. 15, 2022 for Application No. PCT/JP2021/045835 with an English translation.

* cited by examiner

VARIABLE GEOMETRY TURBINE AND TURBOCHARGER

TECHNICAL FIELD

The present disclosure relates to a variable geometry turbine and a turbocharger including the variable geometry turbine.

The present application claims priority based on Japanese Patent Application No. 2021-008190 filed on Jan. 21, 2021, the entire content of which is incorporated herein by reference.

BACKGROUND ART

Conventionally, a variable geometry exhaust turbocharger equipped with a variable geometry turbine is known as an exhaust turbocharger for supercharging intake air of an internal combustion engine (engine) by using energy of exhaust gas of the internal combustion engine (see Patent Document 1, for example). The variable geometry turbine includes a plurality of nozzle vanes arranged in the circumferential direction of the turbine rotor in an exhaust gas passage that leads from the scroll passage of the turbine to the turbine rotor, and the flow-path cross-sectional area of the exhaust gas passage (flow passage between adjacent nozzle vanes) can be adjusted by changing the blade angle of these nozzle vanes with an external actuator. By adjusting the flow-path cross-sectional area of the exhaust gas passage, the variable geometry turbine can change the flow velocity and the pressure of exhaust gas introduced into the turbine rotor to enhance the supercharging effect.

CITATION LIST

Patent Literature

Patent Document 1: JP2011-106276A

SUMMARY

Problems to be Solved

When the exhaust gas supplied to the variable geometry turbine is at low flow rates, each of the nozzle vanes is oriented along the circumferential direction of the turbine rotor to reduce the flow-path cross-sectional area of the exhaust gas passage, so that the exhaust gas that has passed between the nozzle vanes enters the turbine rotor at an angle along the circumferential direction. When the inflow angle into the turbine rotor is along the circumferential direction at low flow rates, a large vortex flow is generated near the hub of the turbine rotor on the leading edge side, and this vortex flow may reduce the efficiency of the turbine. Patent Document 1 discloses that unevenness is formed on the wall surface defining the exhaust gas passage in order to change the flow of exhaust gas before passing between the nozzle vanes, but it is not intended to change the flow of exhaust gas that has passed between the nozzle vanes.

In view of the above, an object of at least one embodiment of the present disclosure is to provide a variable geometry turbine and a turbocharger including the variable geometry turbine whereby it is possible to improve the efficiency of the turbine at low flow rates.

Solution to the Problems

A variable geometry turbine according to at least one embodiment of the present disclosure includes: a turbine rotor; a scroll passage forming part which forms a scroll passage on an outer peripheral side of the turbine rotor; an exhaust gas passage forming part which forms an exhaust gas passage for introducing an exhaust gas from the scroll passage to the turbine rotor; and a variable nozzle unit for adjusting a flow of the exhaust gas in the exhaust gas passage, the variable nozzle unit including a plurality of nozzle vanes disposed in the exhaust gas passage and configured to be rotatable about respective rotation centers. The exhaust gas passage forming part includes: a first plate member having an annular first plate part; and a second plate member having an annular second plate part which defines the exhaust gas passage between the first plate part and the second plate part, the second plate part being disposed closer to a turbine outlet than the first plate part in an axial direction of the turbine rotor. The first plate member has, in a hub-side passage surface of the first plate part facing the exhaust gas passage, at least one groove portion extending from an inner peripheral edge of the first plate part toward an outer peripheral side.

A turbocharger according to an embodiment of the present disclosure includes the variable geometry turbine and a centrifugal compressor configured to be driven by the variable geometry turbine.

Advantageous Effects

At least one embodiment of the present disclosure provides a variable geometry turbine and a turbocharger including the variable geometry turbine whereby it is possible to improve the efficiency of the turbine at low flow rates.

DETAILED DESCRIPTION

Figure 1:
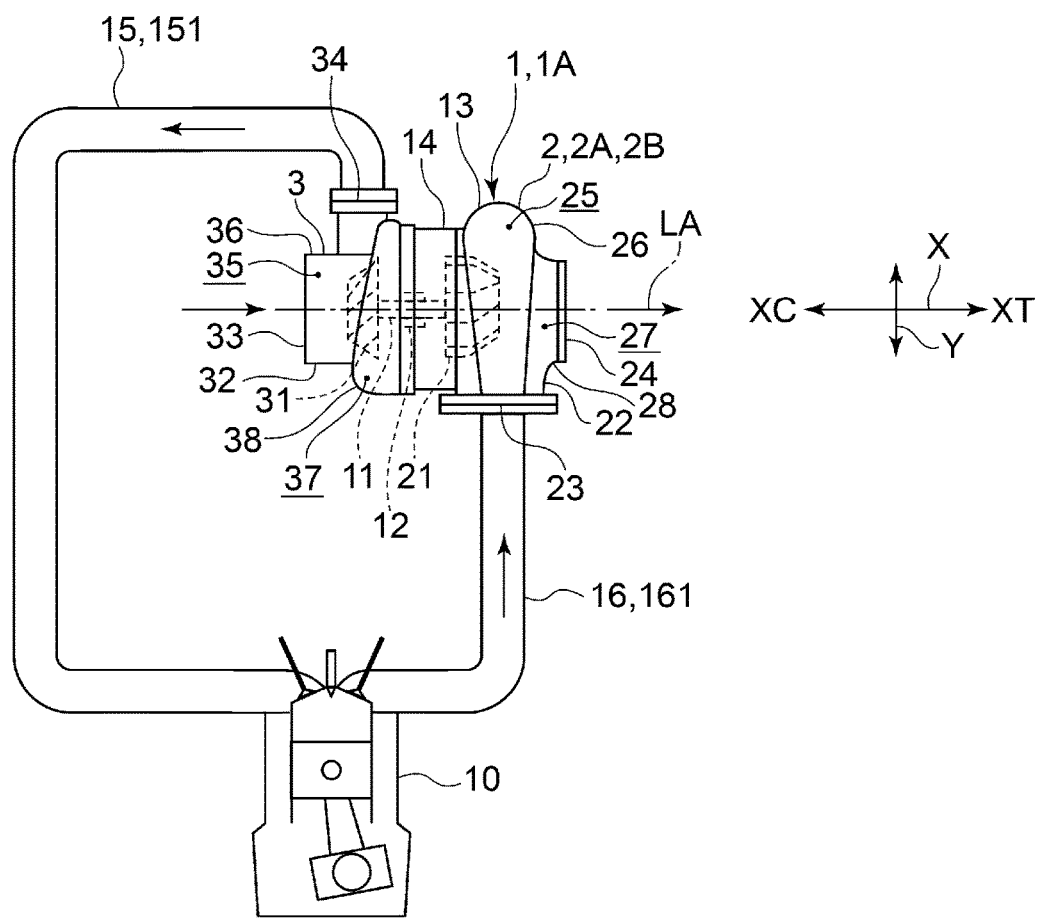
FIG. 1 is a schematic configuration diagram schematically showing the configuration of an internal combustion engine system equipped with a turbocharger according to an embodiment of the present disclosure.

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

(Turbocharger)

FIG. 1 is a schematic configuration diagram schematically showing the configuration of an internal combustion engine system equipped with a turbocharger according to an embodiment of the present disclosure. In the following embodiments, an exhaust turbocharger 1A will be described as an example, but the present disclosure can be applied to a turbocharger 1 other than the exhaust turbocharger 1A.

As shown in FIG. 1, the turbocharger 1 according to some embodiments includes an exhaust turbocharger 1A configured to be driven by energy of exhaust gas discharged from an internal combustion engine 10 (engine) to compress a fluid (e.g., air). As shown in FIG. 1, the turbocharger 1 (exhaust turbocharger 1A) includes a variable geometry turbine 2 and a centrifugal compressor 3 configured to be driven by the variable geometry turbine 2.

As shown in FIG. 1, the turbocharger 1 includes a rotational shaft 11, a turbine rotor 21 disposed on one side (right side in FIG. 1) of the rotational shaft 11, an impeller 31 disposed on the other side (left side in FIG. 1) of the rotational shaft 11, a bearing 12 configured to rotatably support the rotational shaft 11, and a housing 13 configured to house these components (rotational shaft 11, turbine rotor 21, impeller 31, and bearing 12).

In the illustrated embodiment, the housing 13 includes a turbine housing 22 configured to house the turbine rotor 21, a compressor housing 32 configured to house the impeller 31, and a bearing housing 14 configured to house the bearing 12. The variable geometry turbine 2 includes the above-described turbine rotor 21, and the above-described turbine housing 22. The centrifugal compressor 3 includes the above-described impeller 31, and the above-described compressor housing 32.

Hereinafter, the extension direction of the axis LA of the turbine rotor 21 is defined as the axial direction X of the turbine rotor 21, and the direction perpendicular to the axis LA is defined as the radial direction Y. In the axial direction X, the side where the turbine rotor 21 is located with respect to the impeller 31 is defined as the turbine side XT, and the side opposite the turbine side XT, i.e., where the impeller 31 is located with respect to the turbine rotor 21, is defined as the compressor side XC. Further, the outer side in the radial direction Y is also simply expressed as the outer peripheral side, and the inner side in the radial direction Y as the inner peripheral side.

The bearing housing 14 is disposed in the axial direction X between the turbine housing 22 and the compressor housing 32. The bearing 12 is disposed in the axial direction X between the turbine rotor 21 and the impeller 31 and is supported by the bearing housing 14. The bearing housing 14 may be fastened to each of the turbine housing 22 and the compressor housing 32 with fastening members (e.g., bolts) (not shown).

The compressor housing 32 has a gas introduction port 33 for introducing a gas to the inside, and a gas discharge port 34 for discharging the gas having passed through the impeller 31 to the outside. The gas introduction port 33 is formed in one end portion (end portion on the compressor side XC) of the turbocharger 1 in the axial direction X and opens toward the compressor side XC.

The compressor housing 32 internally has a gas introduction passage 35 for feeding the gas introduced from the outside of the compressor housing 32 through the gas introduction port 33 to the impeller 31, and a scroll passage 37 of spiral shape for discharging the gas having passed through the impeller 31 to the outside through the gas discharge port 34. The gas introduction passage 35 extends along the axial direction X. The scroll passage 37 is formed on the outer peripheral side of the impeller 31.

The compressor housing 32 has a gas introduction passage forming part 36 which forms the gas introduction passage 35 and a scroll passage forming part 38 which forms the scroll passage 37. The gas introduction port 33 is formed at the upstream end of the gas introduction passage forming part 36, and the gas discharge port 34 is formed at the downstream end of the scroll passage forming part 38. The impeller 31 is configured to guide the gas introduced from the compressor side XC along the axial direction X to the outer side in the radial direction Y.

The turbine housing 22 has an exhaust gas introduction port 23 for introducing an exhaust gas to the inside, and an exhaust gas discharge port 24 for discharging the exhaust gas having passed through the turbine rotor 21 to the outside. The exhaust gas discharge port 24 is formed in the other end portion (end portion on the turbine side XT) of the turbocharger 1 in the axial direction X and opens toward the turbine side XT.

The turbine housing 22 internally has a scroll passage 25 of spiral shape for feeding the exhaust gas introduced from the outside of the turbine housing 22 through the exhaust gas introduction port 23 to the turbine rotor 21, and an exhaust gas discharge passage 27 for discharging the exhaust gas having passed through the turbine rotor 21 to the outside through the exhaust gas discharge port 24. The exhaust gas discharge passage 27 extends along the axial direction X. The scroll passage 25 is disposed on the outer peripheral side of the turbine rotor 21.

The turbine housing 22 has a scroll passage forming part 26 which forms the scroll passage 25 and an exhaust gas discharge passage forming part 28 which forms the exhaust gas discharge passage 27. The exhaust gas discharge port 24 is formed at the downstream end of the exhaust gas discharge passage forming part 28. The turbine rotor 21 is configured to guide the exhaust gas introduced from the outer side in the radial direction Y to the turbine side XT along the axial direction X.

The turbocharger 1 includes a gas line 15 for directing the gas from the centrifugal compressor 3 to the internal combustion engine 10, and an exhaust gas line 16 for directing the exhaust gas from the internal combustion engine 10 to the variable geometry turbine 2. The gas line 15 includes a conduit 151 connected at one side to the internal combustion engine 10 and at the other side to the gas discharge port 34 of the centrifugal compressor 3. The exhaust gas line 16 includes a conduit 161 connected at one side to the internal combustion engine 10 and at the other side to the exhaust gas introduction port 23 of the variable geometry turbine 2.

The gas having passed through the impeller 31 and the scroll passage 37 of the centrifugal compressor 3 is led to the internal combustion engine 10 (engine) through gas line and is used for combustion in the internal combustion engine 10. The exhaust gas produced by combustion in the internal combustion engine 10 is led through the exhaust gas line 16 and the scroll passage 25 of the variable geometry turbine 2 to the turbine rotor 21.

The turbocharger 1 is configured to rotate the turbine rotor 21 by energy of exhaust gas discharged from the internal combustion engine 10. Since the impeller 31 is mechanically connected to the turbine rotor 21 via the rotational shaft 11, the impeller 31 rotates in conjunction with the rotation of the turbine rotor 21. The turbocharger 1 is configured to compress the gas passing through the impeller 31 by rotation of the impeller 31 to increase the density of the gas and supply it to the internal combustion engine 10.

(Variable Geometry Turbine)

Figure 2:
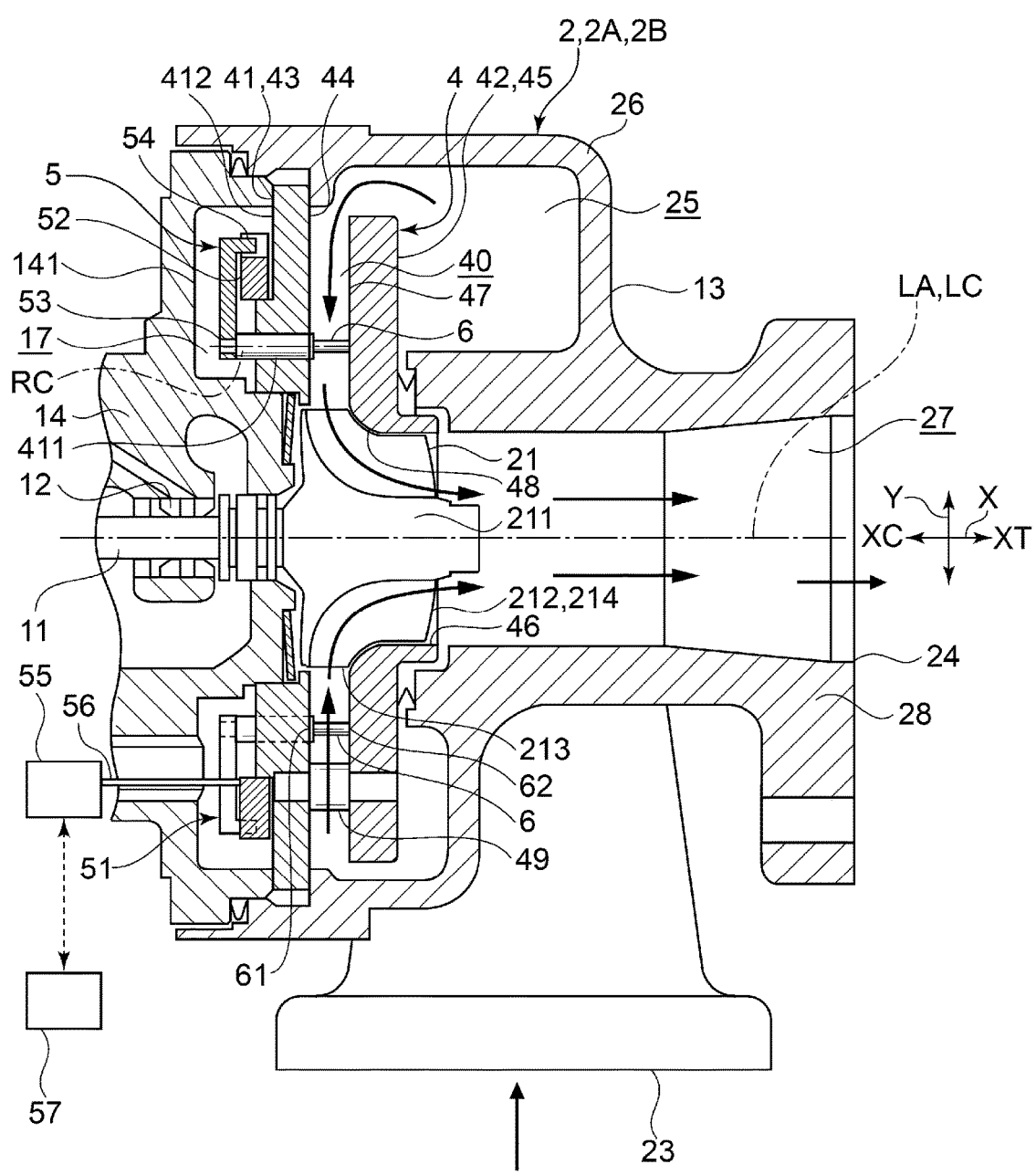
FIG. 2 is a schematic cross-sectional view of a turbine side of a turbocharger including a variable geometry turbine according to an embodiment of the present disclosure.

FIG. 2 is a schematic cross-sectional view of a turbine side of a turbocharger including a variable geometry turbine according to an embodiment of the present disclosure. In FIG. 2, the turbocharger 1 is shown in a schematic cross-section along the axis LA of the rotational shaft 11.

As shown in FIG. 2, the variable geometry turbine 2 includes the above-described turbine rotor 21, the above-described scroll passage forming part 26 which forms the scroll passage 25 on the outer peripheral side of the turbine rotor 21, an exhaust gas passage forming part 4 which forms an exhaust gas passage (nozzle passage) 40 for introducing the exhaust gas from the scroll passage 25 to the turbine rotor 21, and a variable nozzle unit 5 for adjusting the flow of the exhaust gas in the exhaust gas passage 40. The exhaust gas passage 40 is formed between the scroll passage 25 and the turbine rotor 21 so as to surround the periphery (outer side in the radial direction Y) of the turbine rotor 21.

As shown in FIG. 2, the turbine rotor 21 includes a hub 211 and a plurality of blades 212 disposed on the outer surface of the hub 211. The turbine rotor 21 is configured to guide the exhaust gas introduced from the outer side in the radial direction toward the turbine outlet (toward the turbine side XT) in the axial direction X.

(Exhaust Gas Passage Forming Part)

As shown in FIG. 2, the exhaust gas passage forming part 4 includes a first plate member (nozzle mount) 41 fixed to the housing 13, and a second plate member (nozzle plate) 42 disposed closer to the turbine outlet (on the turbine side XT) than the first plate member 41 in the axial direction X and defining the exhaust gas passage 40 between the first plate member 41 and the second plate member 42. Hereinafter, the compressor side XC in the exhaust gas passage 40 may also be referred to as the hub side, and the turbine side XT in the exhaust gas passage 40 as the shroud side.

The first plate member 41 includes an annular first plate part 43 extending along the circumferential direction of the turbine rotor 21 on the outer peripheral side of the turbine rotor 21. The first plate member 41 has a hub-side passage surface 44 formed on the turbine side XT of the first plate part 43. In the illustrated embodiment, the first plate member 41 is fixed to the housing 13 with the outer peripheral edge of the first plate part 43 interposed between the turbine housing 22 and the bearing housing 14.

The second plate member 42 includes an annular second plate part 45 extending along the circumferential direction of the turbine rotor 21 on the outer peripheral side of the turbine rotor 21, and a protruding part 46 protruding from the inner peripheral edge of the second plate part 45 to the turbine side XT along the axial direction X. The second plate member 42 has a shroud-side passage surface 47 formed on the compressor side XC of the second plate part 45, and a shroud surface 48 connected to the shroud-side passage surface 47 and curved convexly. The shroud surface 48 is formed on the inner peripheral edge of the second plate part 45, and a gap (clearance) is formed between the shroud surface 48 and the blade tip of the turbine rotor 21.

The exhaust gas passage 40 is defined between the hub-side passage surface 44 and the shroud-side passage surface 47. Each of the hub-side passage surface 44 and the shroud-side passage surface 47 extends along a direction intersecting (for example, perpendicular to) the axis LA of the rotational shaft 11. The shroud-side passage surface 47 is disposed on the turbine side XT of the hub-side passage surface 44 and faces the hub-side passage surface 44.

The exhaust gas passage forming part 4 may further include at least one nozzle support 49 which supports the first plate member 41 and the second plate member 42 at a distance from each other. The at least one nozzle support 49 is fixed at one side to the first plate part 43 of the first plate member 41 and fixed at the other side to the second plate part 45 of the second plate member 42. The second plate member 42 is supported by the at least one nozzle support 49 at a distance from the first plate member 41 in the axial direction X. In the illustrated embodiment, the at least one nozzle support 49 includes a plurality of nozzle supports 49 arranged at intervals in the circumferential direction of the turbine rotor 21. That is, the exhaust gas passage forming part 4 includes a plurality of nozzle supports 49.

The exhaust gas introduced into the turbine housing 22 passes through the scroll passage 25 and then through the exhaust gas passage 40, and is led to the turbine rotor 21 to rotate the turbine rotor 21. After passing through the turbine rotor 21, the exhaust gas passes through the exhaust gas discharge passage 27, and is discharged out of the turbine housing 22 through the exhaust gas discharge port 24.

(Variable Nozzle Unit)

As shown in FIG. 2, the variable nozzle unit 5 includes a plurality of nozzle vanes 6 disposed in the exhaust gas passage 40 at intervals in the circumferential direction of the turbine rotor 21, and a rotation mechanism part 51 configured to rotate the plurality of nozzle vanes 6 about their respective rotation centers RC. The variable nozzle unit 5 can adjust the flow-path cross-sectional area of the exhaust gas passage 40 by changing the blade angle of the plurality of nozzle vanes arranged in the exhaust gas passage 40 with the rotation mechanism part 51. The variable geometry turbine 2 can change the flow velocity and the pressure of exhaust gas introduced into the turbine rotor 21 by increasing or decreasing the flow-path cross-sectional area of the exhaust gas passage 40 with the variable nozzle unit 5, thereby controlling the boost pressure of the variable geometry turbine 2.

As shown in FIG. 2, each of the nozzle vanes 6 has a hub-side end 61 with a gap (clearance) from the hub-side passage surface 44, and a shroud-side end 62 with a gap (clearance) from the shroud-side passage surface 47.

As shown in FIG. 2, the rotation mechanism part 51 includes an annular drive ring 52 disposed rotatably along the circumferential direction of the turbine rotor 21 with respect to the first plate member 41, a plurality of vane shafts 53, a plurality of lever plates 54, an actuator 55 configured to rotate the drive ring 52 about the axis LC, and a controller 57 (control device) configured to control the driving of a drive shaft 56 of the actuator 55 (that is, the amount of movement along the circumferential direction about the axis LC).

Figure 3:
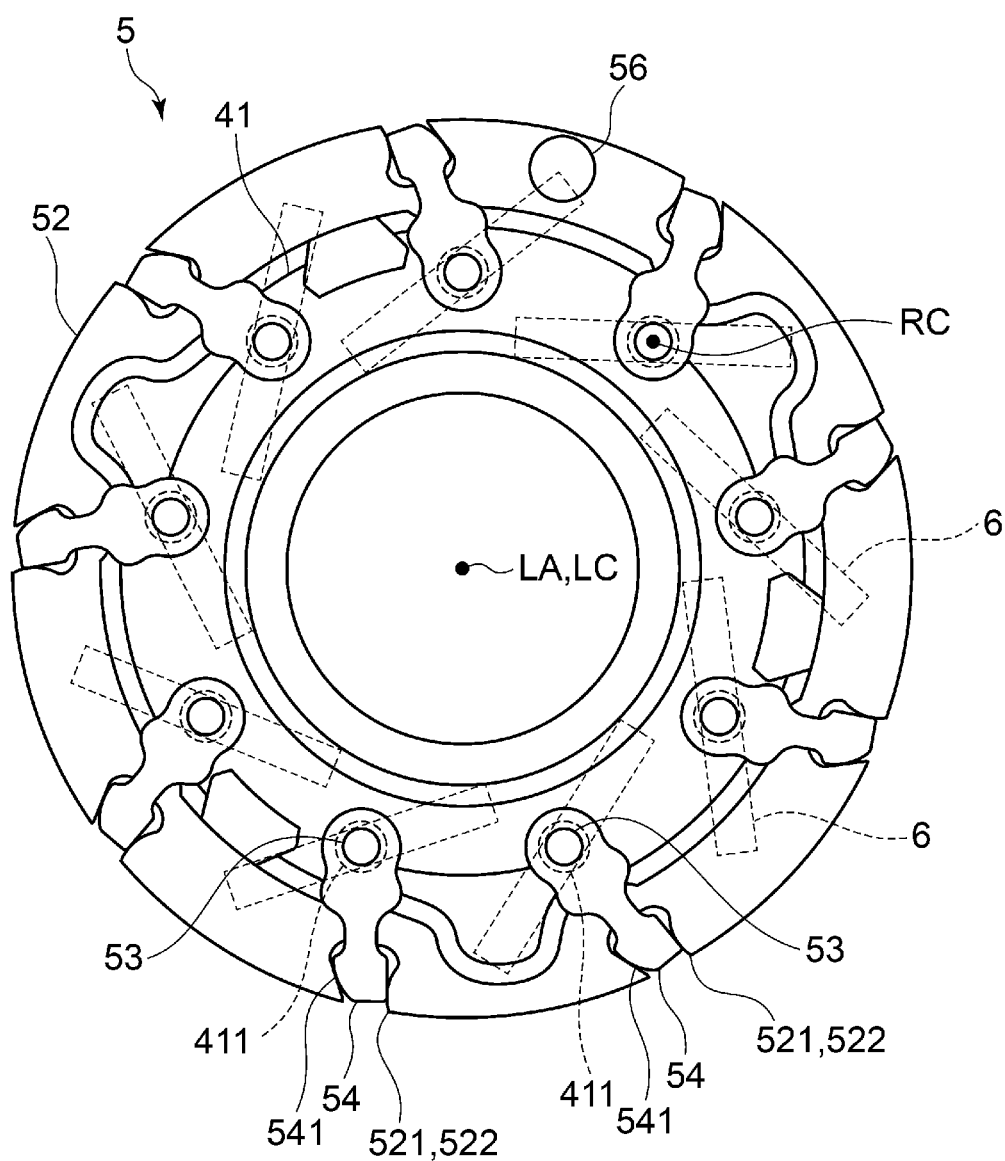
FIG. 3 is an explanatory diagram for describing a variable nozzle unit according to an embodiment of the present disclosure.

FIG. 3 is an explanatory diagram for describing a variable nozzle unit according to an embodiment of the present disclosure. FIG. 3 schematically shows the variable nozzle unit 5 as viewed from the compressor side XC in the axial direction X.

As shown in FIG. 3, the rotation mechanism part 51 includes the same number of vane shafts 53 and lever plates 54 as the nozzle vanes 6 included in the variable nozzle unit 5. Each vane shaft 53 is fixed at one side to the nozzle vane 6 and mechanically connected at the other side to the lever plate 54. The other side of the lever plate 54 is mechanically connected to the drive ring 52. The actuator 55 includes an electric motor, an air cylinder, or the like. The drive shaft 56 of the actuator 55 is mechanically connected to the drive ring 52.

Each of the lever plates 54 includes a fitting portion 541 fitted into a fitted portion 521 formed in the drive ring 52. The fitted portion 521 includes a groove portion 522 formed in an outer peripheral edge portion of the drive ring 52, and the fitting portion 541 is configured to be received in the groove portion 522 and loosely fit into the groove portion 522.

As shown in FIG. 3, the first plate member 41 has a plurality of insertion holes 411 formed at intervals along the circumferential direction around the axis LA. The first plate member 41 has the same number of insertion holes 411 as the nozzle vanes 6 included in the variable nozzle unit 5. Each of the vane shafts 53 is rotatably inserted through one of the insertion holes 411.

As shown in FIG. 2, an annular interior space 17 is formed by a back surface 412 of the first plate part 43 of the first plate member 41 opposite (compressor side XC) the hub-side passage surface 44 and an annular groove portion 141 of the bearing housing 14 formed on the turbine side XT. The drive ring 52 and the plurality of lever plates 54 are accommodated in the interior space 17 formed inside the housing 13.

In the power transmission path from the actuator 55 to the plurality of nozzle vanes 6, the drive shaft 56 and the drive ring 52, the drive ring 52 and the lever plates 54, and the lever plates 54 and the vane shafts 53, are connected to each other. When the actuator 55 is driven by the controller 57, the drive ring 52 is rotated about the axis LC as the drive shaft 56 of the actuator 55 is moved. When the drive ring 52 is rotated, the nozzle vanes 6 are rotated about the respective rotation centers RC via the lever plates 54 and the vane shafts 53 in conjunction with the rotation of the drive ring 52 to change their blade angle.

When the drive ring 52 is rotated to one side in the circumferential direction of the turbine rotor 21, the circumferentially adjacent nozzle vanes 6 move in the direction away from each other, and the exhaust gas passage 40 between the nozzle vanes 6, i.e., the flow-path cross-sectional area of the exhaust gas passage 40, increases. When the drive ring 52 is rotated to the other side in the circumferential direction of the turbine rotor 21, the circumferentially adjacent nozzle vanes 6 move in the direction toward each other, and the exhaust gas passage 40 between the nozzle vanes 6, i.e., the flow-path cross-sectional area of the exhaust gas passage 40, decreases.

Figure 4:
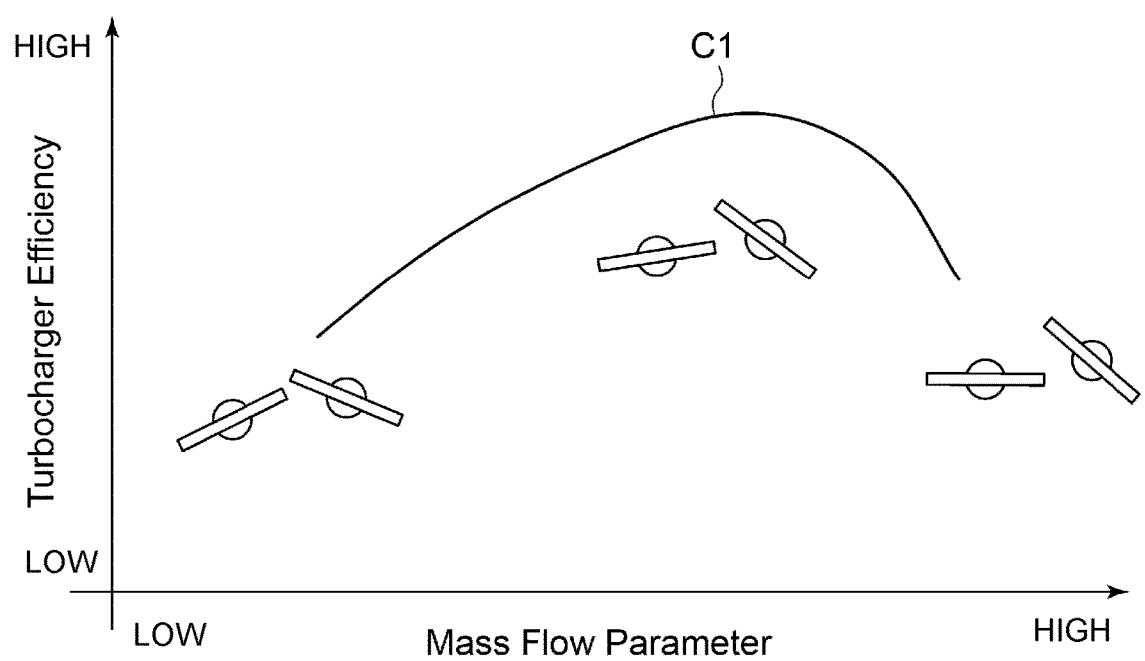
FIG. 4 is an explanatory diagram for describing a relationship between the flow rate of exhaust gas supplied to a variable geometry turbine and the efficiency of a turbocharger.

FIG. 4 is an explanatory diagram for describing a relationship between the flow rate of exhaust gas supplied to a variable geometry turbine and the efficiency of a turbocharger. FIG. 4 shows, in a graph with the horizontal axis representing the flow rate of exhaust gas supplied to the variable geometry turbine 2 and the vertical axis representing the efficiency of the turbocharger 1, curve C1 showing the relationship between the flow rate of exhaust gas and the efficiency of the turbocharger 1, and schematic diagrams showing the open and closed states of the nozzle vanes 6 at low flow rates, efficiency peak, and higher flow rate than efficiency peak.

The turbocharger 1 is configured such that the efficiency of the turbocharger 1 peaks when the exhaust gas supplied to the variable geometry turbine 2 is at high flow rates, as shown in FIG. 4. As shown in FIG. 4, when the flow rate of exhaust gas supplied to the variable geometry turbine 2 is low, the adjacent nozzle vanes 6 are closer to each other in the circumferential direction of the turbine rotor 21 than at high flow rates, and the flow-path cross-sectional area of the exhaust gas passage 40 is smaller. At such low flow rates, each of the nozzle vanes 6 is oriented along the circumferential direction, so that the exhaust gas having passed between the nozzle vanes 6 enters the turbine rotor 21 at an angle along the circumferential direction. The inflow angle into the turbine rotor 21 is not uniform in the span direction, and the hub side and shroud side have different inflow angles from the middle portion in the span direction due to the clearances formed on both sides.

Figure 5:
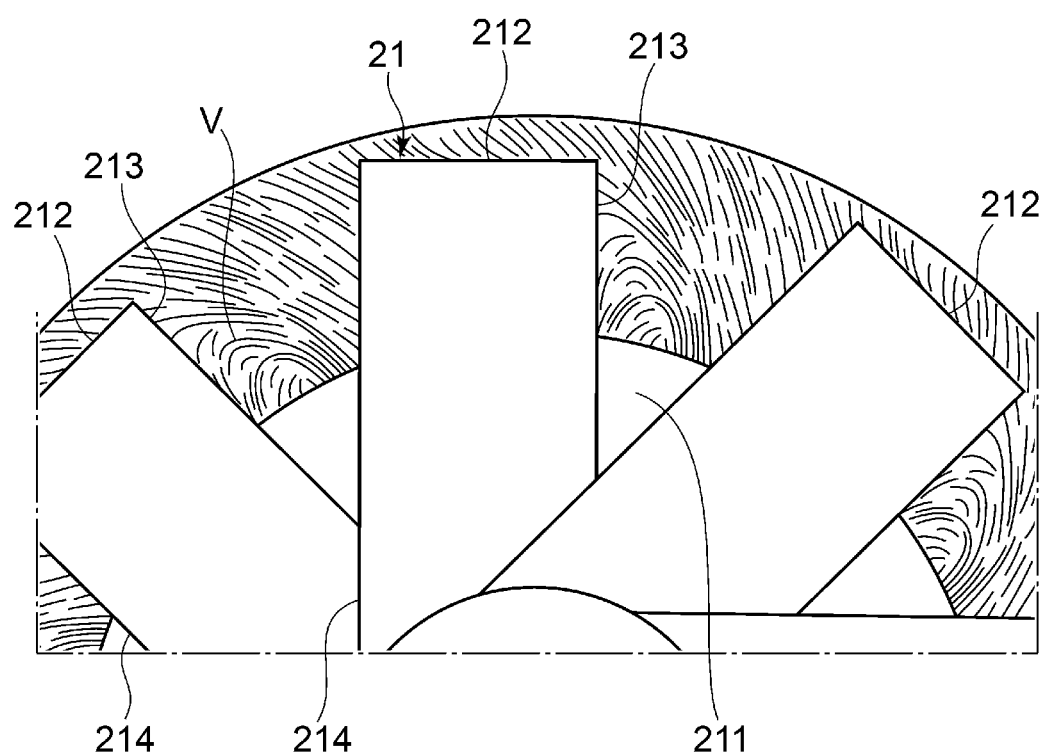
FIG. 5 is an explanatory diagram for describing the exhaust gas flow in the vicinity of a trailing edge side of a turbine rotor of a variable geometry turbine according to a comparative example.
Figure 6:
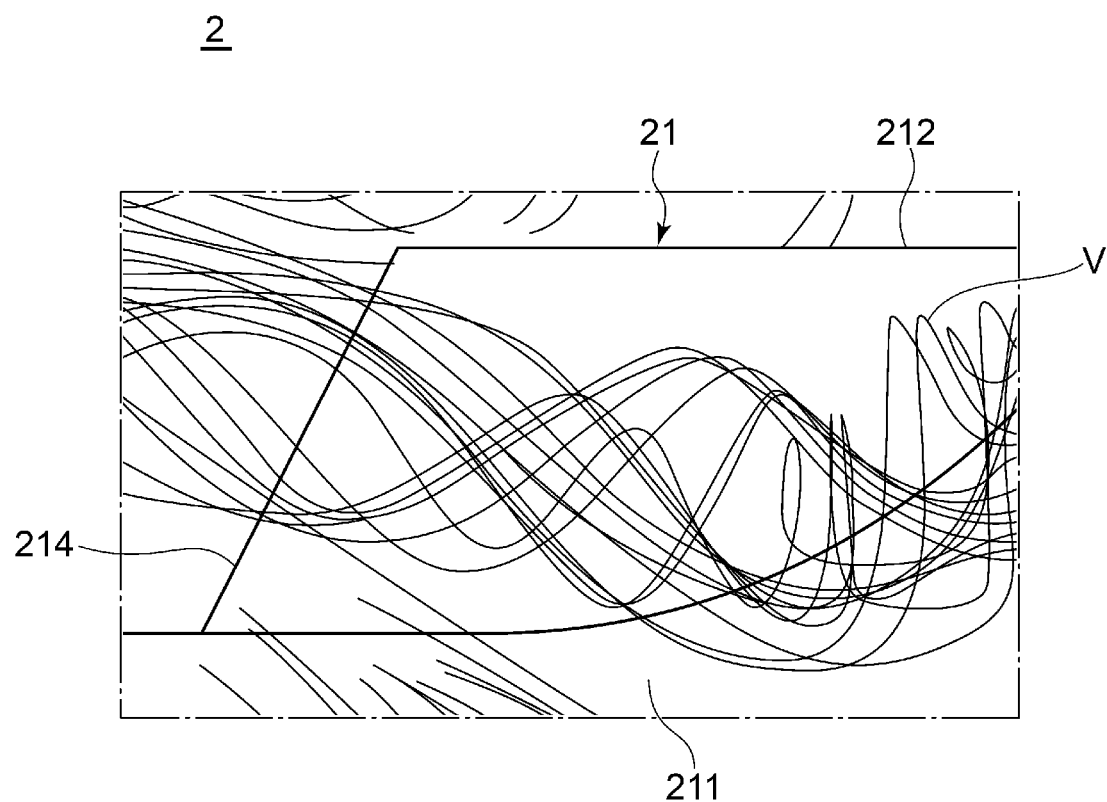
FIG. 6 is an explanatory diagram for describing the exhaust gas flow in the vicinity of a turbine rotor of a variable geometry turbine according to a comparative example.

FIG. 5 is an explanatory diagram for describing the exhaust gas flow in the vicinity of the trailing edge side of a turbine rotor of a variable geometry turbine according to a comparative example. FIG. 6 is an explanatory diagram for describing the exhaust gas flow in the vicinity of a turbine rotor of a variable geometry turbine according to a comparative example.

The hub-side passage surface 44 of the variable geometry turbine 2 according to the comparative example does not have a groove portion 7, which will be described below, and is flat over the entire surface. In this case, since the inflow angle of exhaust gas into the turbine rotor 21 is along the circumferential direction at low flow rates, as shown in FIG. 5, a large vortex flow V may be generated near the outer surface of the hub 211 on the leading edge 213 side of the turbine rotor 21. As shown in FIG. 6, this large vortex flow V flows along the outer surface of the hub 211 toward the trailing edge 214 of the turbine rotor 21, so that the vortex flow V causes flow loss over the entire area from the leading edge 213 to the trailing edge 214 of the turbine rotor 21, which may reduce the efficiency of the variable geometry turbine 2.

Figure 7:
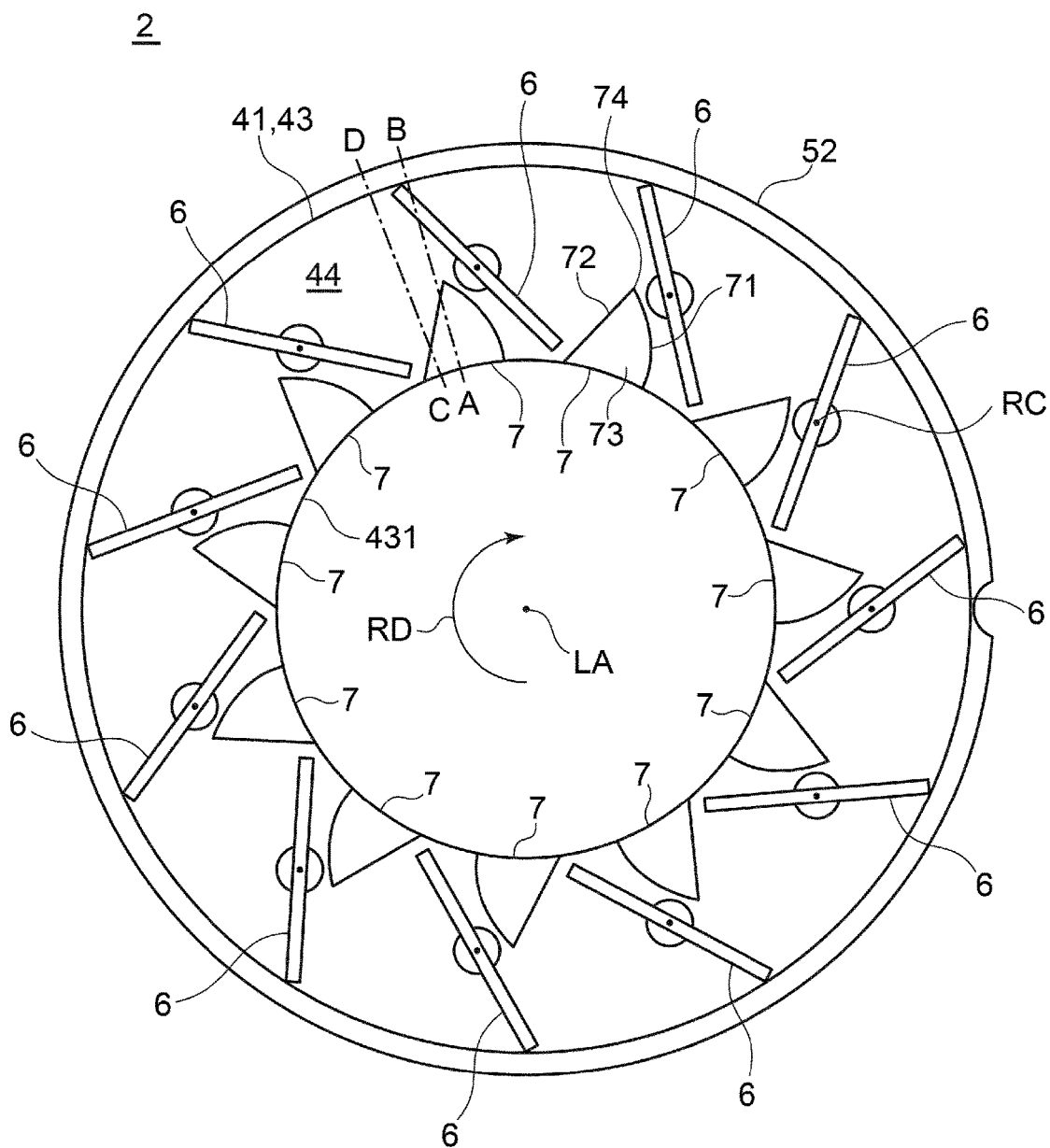
FIG. 7 is a schematic diagram of the exhaust gas passage of the variable geometry turbine according to an embodiment, as viewed from the turbine outlet side in the axial direction, when the nozzle vanes are open.
Figure 8:
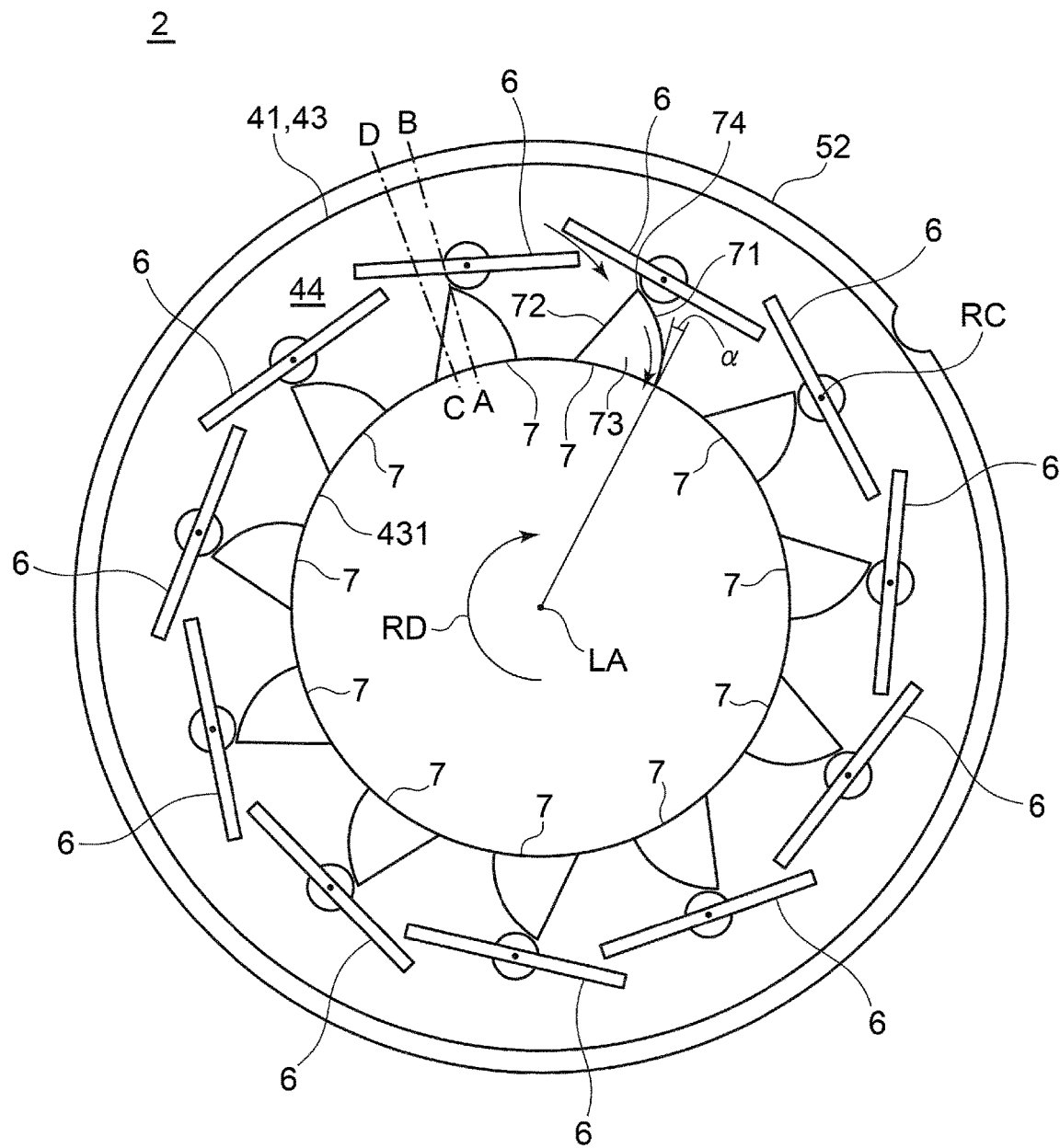
FIG. 8 is a schematic diagram of the exhaust gas passage of the variable geometry turbine according to an embodiment, as viewed from the turbine outlet side in the axial direction, when the nozzle vanes are closed.

FIGS. 7 and 8 are each a schematic diagram of the exhaust gas passage of the variable geometry turbine according to an embodiment, as viewed from the turbine outlet side in the axial direction. FIG. 7 shows the state where the nozzle vanes are open at high flow rates. FIG. 8 shows the state where the nozzle vanes are closed at low flow rates. As shown in FIG. 8, when the nozzle vanes 6 are closed, a gap is formed between the adjacent nozzle vanes 6 in the circumferential direction of the turbine rotor 21, and the exhaust gas passes through this gap.

As shown in FIGS. 7 and 8, the first plate member 41 has, in the hub-side passage surface 44 of the first plate part 43 facing the exhaust gas passage 40, at least one groove portion 7 extending from the inner peripheral edge 431 of the first plate part 43 toward the outer peripheral side. In the illustrated embodiment, the hub-side passage surface 44 has the same number of groove portions 7 as the nozzle vanes 6. Each of the groove portions 7 is at least partially located between the rotation centers RC of the adjacent nozzle vanes 6 in the circumferential direction of the turbine rotor 21. The outer peripheral end 74 of each of the groove portions 7 is located inward of the rotation centers RC in the radial direction.

As shown in FIG. 2, the variable geometry turbine 2 according to some embodiments includes the above-described turbine rotor 21, the above-described scroll passage forming part 26 which forms the scroll passage 25, the above-described exhaust gas passage forming part 4 which forms the exhaust gas passage 40, and the above-described variable nozzle unit 5 including the plurality of nozzle vanes 6. As shown in FIG. 2, the exhaust gas passage forming part 4 includes the above-described first plate member 41 having the annular first plate part 43, and the above-described second plate member 42 having the annular second plate part 45. As shown in FIGS. 7 and 8, the first plate member 41 has, in the hub-side passage surface 44 of the first plate part 43 facing the exhaust gas passage 40, at least one groove portion 7 extending from the inner peripheral edge 431 of the first plate part 43 toward the outer peripheral side.

With the above configuration, since the groove portion 7 formed in the hub-side passage surface 44 extends from the inner peripheral edge 431 of the first plate part 43 toward the outer peripheral side, the exhaust gas entering the groove portion 7 can be guided directly to the turbine rotor 21 from inside the groove portion 7. The exhaust gas flowing in the groove portion 7 is guided by the wall surface (first wall surface 71) of the groove portion 7, which modifies the inflow angle into the turbine rotor 21 to an angle along the wall surface. As a result, the inflow angle (inclination angle with respect to the radial direction) of exhaust gas flowing on the hub side toward the leading edge 213 of the turbine rotor 21 at low flow rates can be maintained at a predetermined angle (fixed value a).

Figure 9:
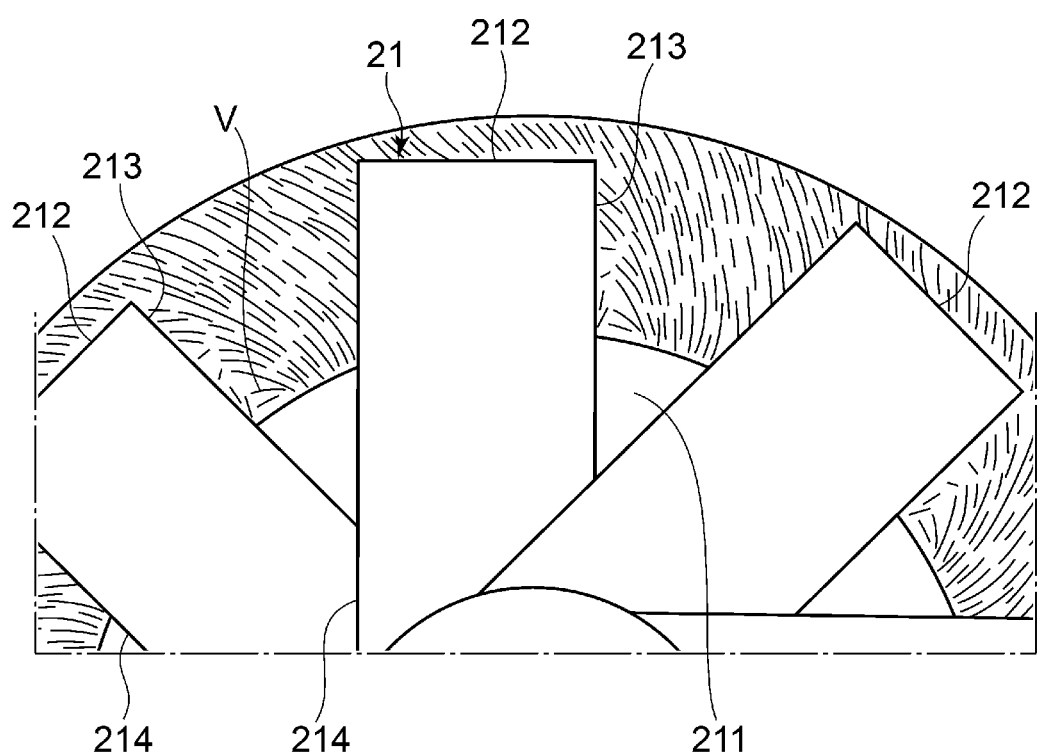
FIG. 9 is an explanatory diagram for describing the exhaust gas flow in the vicinity of the trailing edge side of the turbine rotor of the variable geometry turbine according to an embodiment.
Figure 10:
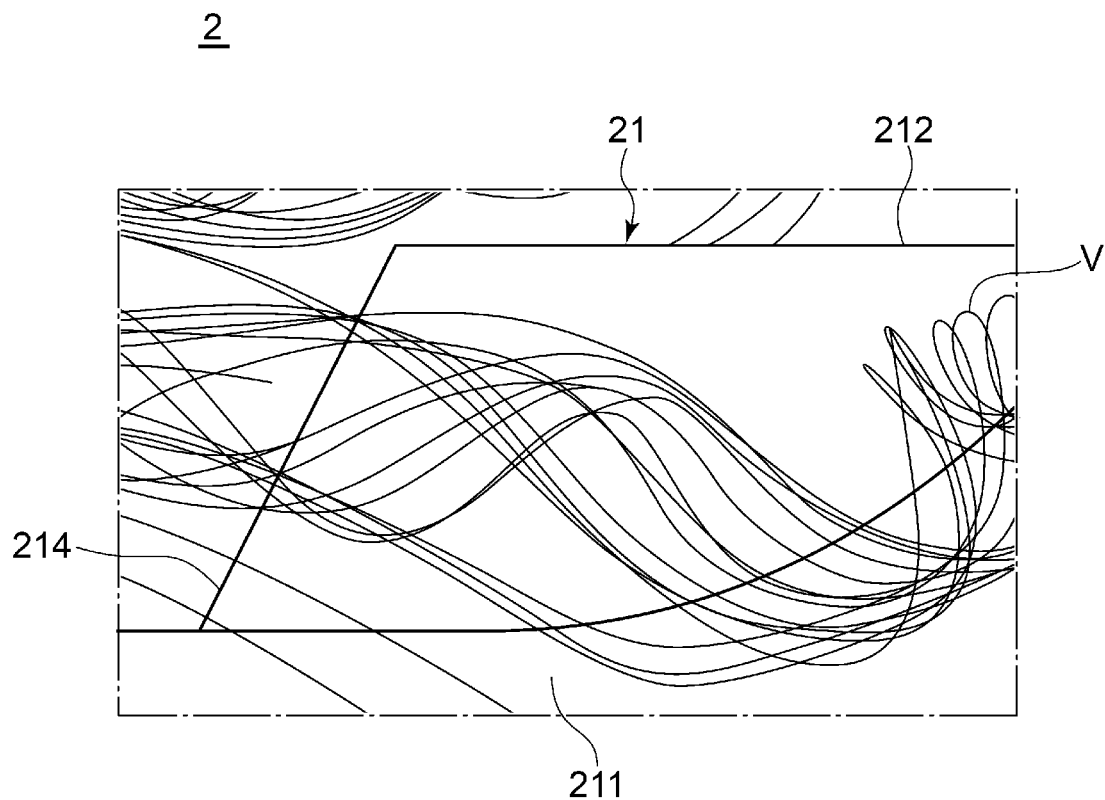
FIG. 10 is an explanatory diagram for describing the exhaust gas flow in the vicinity of the turbine rotor of the variable geometry turbine according to an embodiment.

FIG. 9 is an explanatory diagram for describing the exhaust gas flow in the vicinity of the trailing edge side of the turbine rotor of the variable geometry turbine according to an embodiment. FIG. 10 is an explanatory diagram for describing the exhaust gas flow in the vicinity of the turbine rotor of the variable geometry turbine according to an embodiment.

By maintaining the inflow angle at a predetermined angle (fixed value a) at low flow rates with the groove portion 7, it is possible to reduce the vortex flow V generated near the hub 211 of the turbine rotor 21 on the leading edge 213 side at low flow rates, as shown in FIG. 9. By reducing the vortex flow V, as shown in FIG. 10, the turbulence of exhaust gas flow near the hub 211 of the turbine rotor 21 can be suppressed, thus reducing the loss of the turbine rotor 21 due to the vortex flow V. Thus, it is possible to improve the efficiency of the turbine 2 at low flow rates.

Figure 11:
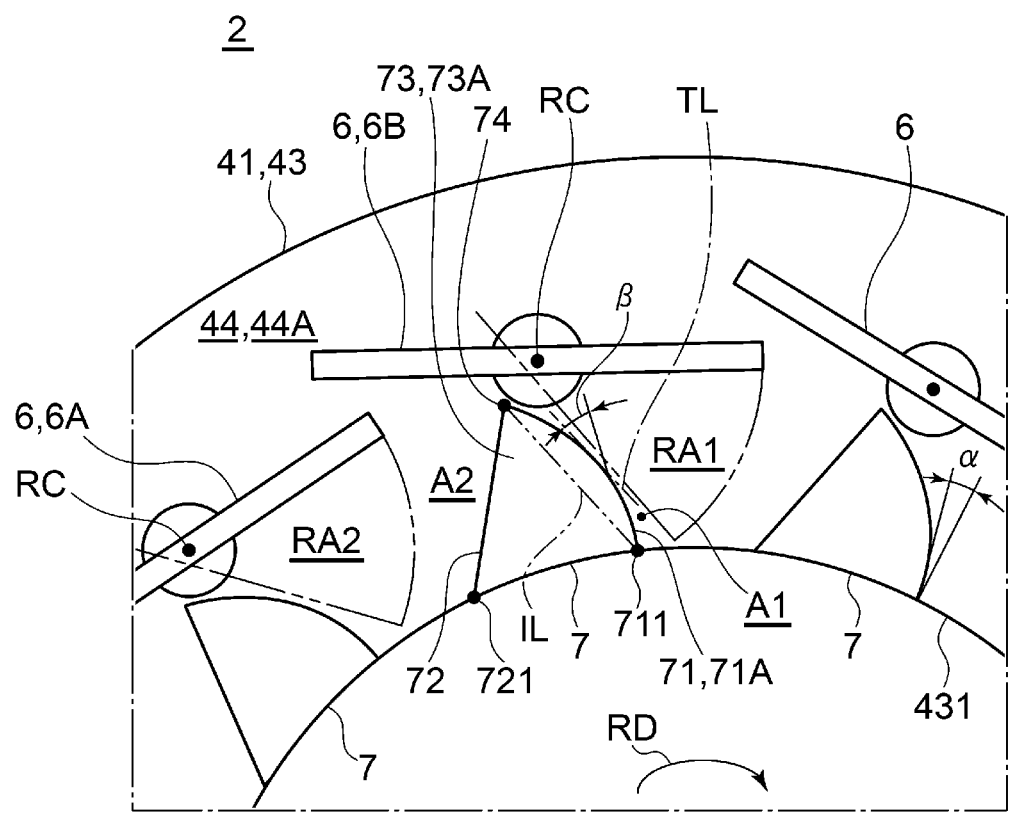
FIG. 11 is a schematic diagram of the exhaust gas passage of the variable geometry turbine according to an embodiment, as viewed from the turbine outlet side in the axial direction, which shows an enlarged schematic of the area near the groove portion.

FIG. 11 is a schematic diagram of the exhaust gas passage of the variable geometry turbine according to an embodiment, as viewed from the turbine outlet side in the axial direction, which shows an enlarged schematic of the area near the groove portion.

As shown in FIG. 11, the plurality of nozzle vanes 6 includes an upstream nozzle vane 6A that is adjacent to one groove portion 7 of the plurality of groove portions 7 on the upstream side in the rotational direction RD of the turbine rotor 21, and a downstream nozzle vane 6B that is adjacent to the one groove portion 7 on the downstream side in the rotational direction RD of the turbine rotor 21. Each of the groove portions 7 includes a first wall surface 71 and a second wall surface 72 extending from the hub-side passage surface 44 of the first plate part 43 toward the opposite back surface 412, and a third wall surface (bottom surface) 73 connecting the first wall surface 71 and the second wall surface 72.

In some embodiments, as shown in FIG. 11, the at least one groove portion 7 includes a first wall surface 71 connecting an outer peripheral end 74 of the groove portion 7 to a downstream end 711 of the groove portion 7 on the inner peripheral edge 431 located downstream of the outer peripheral end 74 in the rotational direction RD of the turbine rotor 21.

With the above configuration, the exhaust gas flowing in the groove portion 7 is guided by the first wall surface 71 and is modified to an angle along the first wall surface 71. With the first wall surface 71, the inflow angle (inclination angle with respect to the radial direction of the turbine rotor 21) of exhaust gas flowing on the hub side toward the leading edge 213 of the turbine rotor 21 at low flow rates can be maintained at a predetermined angle (fixed value a). Since the first wall surface 71 connects the outer peripheral end 74 of the groove portion 7 to the downstream end 711 of the groove portion 7 on the inner peripheral edge 431, the flow direction of exhaust gas can be modified without much obstruction to the flow of exhaust gas in the groove portion 7.

In some embodiments, as shown in FIG. 11, in plan view perpendicular to the axis LA of the turbine rotor 21, the first wall surface 71 includes a convex surface 71A protruding downstream in the rotational direction RD with respect to an imaginary line IL linearly connecting the outer peripheral end 74 of the groove portion 7 to the downstream end 711 on the inner peripheral edge 431.

With the above configuration, since the first wall surface 71 includes the convex surface 71A protruding downstream in the rotational direction RD of the turbine rotor 21, the exhaust gas flowing in the groove portion 7 can be gently guided. This prevents the exhaust gas from separating from the first wall surface 71, thus modifying the flow direction of exhaust gas without much obstruction to the flow of exhaust gas by the first wall surface 71.

In some embodiments, as shown in FIG. 11, the convex surface 71A is inclined such that the inclination angle β of the tangent line TL of the convex surface 71A with respect to the radial direction of the turbine rotor 21 in plan view perpendicular to the axis LA of the turbine rotor 21 decreases toward the downstream end 711. The inclination angle β is the smallest angle α at the downstream end 711. The inflow angle of exhaust gas flowing along the convex surface 71A into the turbine rotor 21 is also the angle α.

With the above configuration, since the convex surface 71A is inclined such that the inclination angle β of the tangent line TL of the convex surface 71A with respect to the radial direction of the turbine rotor 21 in plan view perpendicular to the axis LA of the turbine rotor 21 decreases toward the downstream end 711, the inflow angle (inclination angle with respect to the radial direction) of exhaust gas flowing along the convex surface 71A into the turbine rotor 21 can be modified to be small, while preventing the exhaust gas from separating from the convex surface 71A.

In some embodiments, as shown in FIG. 11, the plurality of nozzle vanes 6 includes a downstream nozzle vane 6B that is adjacent to the at least one groove portion 7 on the downstream side in the rotational direction RD of the turbine rotor 21. In plan view perpendicular to the axis LA of the turbine rotor 21, the hub-side passage surface 44 of the first plate member 41 has a region A1 where the groove portion 7 is not formed between the first wall surface 71 of the groove portion 7 and a rotating range RA1 of the downstream nozzle vane 6B in the rotational direction RD of the turbine rotor 21. The rotating range RA1 of the downstream nozzle vane 6B is the projected area of the downstream nozzle vane 6B between the open state (see FIG. 7) and closed state (see FIG. 8) of the downstream nozzle vane 6B on the hub-side passage surface 44 of the first plate part 43 in the plan view. The groove portion 7 is not formed in the rotating range RA1.

With the above configuration, since the hub-side passage surface 44 has the region A1 where the groove portion 7 is not formed between the first wall surface 71 and the rotating range RA1 of the downstream nozzle vane 6B, it is possible to suppress an increase in clearance between the hub-side passage surface 44 and the hub-side end 61 of the downstream nozzle vane 6B due to the groove portion 7, suppressing an increase in exhaust gas flow loss due to the increased clearance. Additionally, when the hub-side passage surface 44 has the region A1 where the groove portion 7 is not formed between the first wall surface 71 and the rotating range RA1 of the downstream nozzle vane 6B, it is possible to increase the degree of freedom in the shape of the first wall surface 71 when setting the shape of the first wall surface 71.

In some embodiments, as shown in FIG. 11, the at least one groove portion 7 further includes a second wall surface 72 connecting an outer peripheral end 74 of the groove portion 7 to an upstream end 721 of the groove portion 7 on the inner peripheral edge 431 located upstream of the outer peripheral end 74 in the rotational direction RD of the turbine rotor 21. In the illustrated embodiment, in plan view perpendicular to the axis LA of the turbine rotor 21, the second wall surface 72 linearly connects the outer peripheral end 74 and the upstream end 721, but it may connect the outer peripheral end 74 and the upstream end 721 in a curved line.

With the above configuration, the groove portion 7 includes the first wall surface 71 connecting the outer peripheral end 74 of the groove portion 7 to the downstream end 711 of the groove portion 7 on the inner peripheral edge 431, and the second wall surface 72 connecting the outer peripheral end 74 of the groove portion 7 to the upstream end 721 of the groove portion 7 on the inner peripheral edge 431. In this case, the area (projected area) of the groove portion 7 in plan view perpendicular to the axis LA of the turbine rotor 21 can be large, allowing a large amount of exhaust gas to flow into the groove portion 7. In this case, the flow direction of a large amount of exhaust gas in the groove portion 7 can be modified by the groove portion 7, so that the flow of exhaust gas flowing on the hub side at low flow rates can be effectively modified.

In some embodiments, as shown in FIG. 11, the plurality of nozzle vanes 6 includes an upstream nozzle vane 6A that is adjacent to the at least one groove portion 7 on the upstream side in the rotational direction RD of the turbine rotor 21. In plan view perpendicular to the axis LA of the turbine rotor 21, the hub-side passage surface 44 of the first plate member 41 has a region A2 where the groove portion 7 is not formed between the second wall surface 72 of the groove portion 7 and a rotating range RA2 of the upstream nozzle vane 6A in the rotational direction RD of the turbine rotor 21. The rotating range RA2 of the upstream nozzle vane 6A is the projected area of the upstream nozzle vane 6A between the open state (see FIG. 7) and closed state (see FIG. 8) of the upstream nozzle vane 6A on the hub-side passage surface 44 of the first plate part 43 in the plan view. The groove portion 7 is not formed in the rotating range RA2.

With the above configuration, since the hub-side passage surface 44 has the region A2 where the groove portion 7 is not formed between the second wall surface 72 and the rotating range RA2 of the upstream nozzle vane 6A, it is possible to suppress an increase in clearance between the hub-side passage surface 44 and the hub-side end 61 of the upstream nozzle vane 6A due to the groove portion 7, suppressing an increase in exhaust gas flow loss due to the increased clearance.

Figure 12:
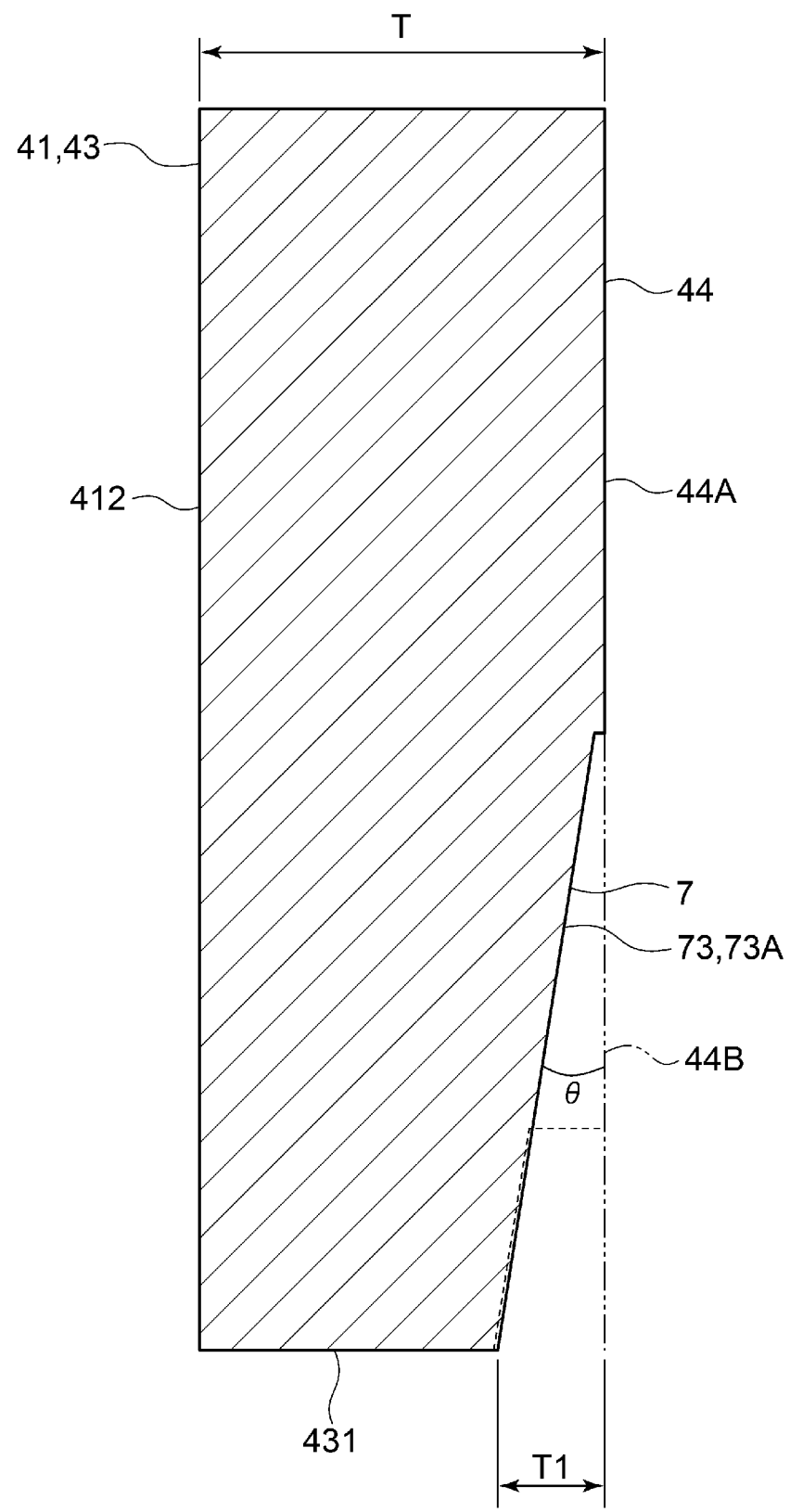
FIG. 12 is a schematic cross-sectional view of the first plate member of the variable geometry turbine according to an embodiment in a cross-section along the axial direction of the turbine rotor.

FIG. 12 is a schematic cross-sectional view of the first plate member of the variable geometry turbine according to an embodiment in a cross-section along the axial direction of the turbine rotor. FIG. 12 schematically shows the first plate member 41 as viewed from the upstream side in the rotational direction RD in cross-section A-B shown in FIG. 7. The shape of the groove portion 7 in cross section C-D shown in FIG. 7 is indicated by the dotted line in FIG. 12.

In some embodiments, as shown in FIG. 12, the hub-side passage surface 44 has a flat surface 44A extending along the radial direction of the turbine rotor 21. The at least one groove portion 7 is configured such that a depth from the flat surface 44A increases toward the inner peripheral side of the first plate part 43.

With the above configuration, since the groove portion 7 is configured such that the depth from the flat surface 44A increases toward the inner peripheral side of the first plate part 43, the exhaust gas flowing along the flat surface 44A can easily flow into the groove portion 7. In addition, the wall surface (third wall surface 73) of the groove portion 7 gently guides the exhaust gas flowing in the groove portion 7 to the inner peripheral side and leads it to the turbine rotor 21. This suppresses turbulence in the exhaust gas flow on the hub side and in the groove portion 7 at low flow rates. Thus, it is possible to suppress a reduction in efficiency of the turbine 2 at low flow rates.

In some embodiments, in plan view perpendicular to the axis LA of the turbine rotor 21, as shown in FIG. 12, the at least one groove portion 7 includes an inclined surface 73A extending along a direction intersecting the flat surface 44A and satisfying a condition that the inclination angle θ with respect to an imaginary extended surface 44B extending the flat surface 44A is 0°<θ<15°.

With the above configuration, if the inclination angle θ of the inclined surface 73A with respect to the imaginary extended surface 44B is too large, the exhaust gas may separate from the inclined surface 73A, and the inclined surface 73A may be unable to guide the exhaust gas. By making the inclination angle θ of the inclined surface 73A satisfy the above condition, the separation of the exhaust gas from the inclined surface 73A can be suppressed, and the exhaust gas flowing in the groove portion 7 can be guided to the inner peripheral side by the inclined surface 73A.

In some embodiments, as shown in FIG. 12, the hub-side passage surface 44 has a flat surface 44A extending along the radial direction of the turbine rotor 21. The at least one groove portion 7 is configured to satisfy a condition of $0<T1\leq0.2\ T$, where T is a thickness of the first plate part 43, and T1 is a maximum depth of the at least one groove portion 7 from the flat surface 44A. The groove portion 7 has the maximum depth from the flat surface 44A at the inner peripheral edge 431. If the groove portion 7 is too deep (i.e., the maximum depth T1 is too large), the flow toward the back surface of the turbine rotor 21 may increase and the thrust force on the turbine rotor 21 may change. Additionally, if the groove portion 7 is too deep, the mainstream flow in the exhaust gas passage 40 may be obstructed, and the exhaust gas flow loss may increase. Preferably, the groove portion 7 is configured to satisfy a condition of $0<T1\leq0.1\ T$.

With the above configuration, if the maximum depth T1 of the groove portion 7 from the flat surface 44A is too large, the amount of exhaust gas flowing into the groove portion 7 may increase, obstructing the mainstream flow in the exhaust gas passage 40 and increasing the exhaust gas flow loss. By making the maximum depth T1 satisfy the above condition, the obstruction of the mainstream flow in the exhaust gas passage 40 due to the groove portion 7 can be suppressed. Thus, it is possible to suppress a reduction in efficiency of the turbine 2.

As shown in FIG. 1, the turbocharger 1 according to some embodiments includes the above-described variable geometry turbine 2 and a centrifugal compressor 3 configured to be driven by the variable geometry turbine 2. In this case, the vortex flow V generated near the hub 211 of the turbine rotor 21 on the leading edge 213 side at low flow rates can be reduced, so that the efficiency of the variable geometry turbine 2 and the turbocharger 1 including the variable geometry turbine 2 at low flow rates can be improved.

The present disclosure is not limited to the embodiments described above, but includes modifications to the embodiments described above, and embodiments composed of combinations of those embodiments.

The contents described in the above embodiments would be understood as follows, for instance.

1) A variable geometry turbine (2) according to at least one embodiment of the present disclosure includes: a turbine rotor (21); a scroll passage forming part (26) which forms a scroll passage (25) on an outer peripheral side of the turbine rotor (21); an exhaust gas passage forming part (4) which forms an exhaust gas passage (40) for introducing an exhaust gas from the scroll passage (25) to the turbine rotor (21); and a variable nozzle unit (5) for adjusting a flow of the exhaust gas in the exhaust gas passage (40), the variable nozzle unit (5) including a plurality of nozzle vanes (6) disposed in the exhaust gas passage (40) and configured to be rotatable about respective rotation centers. The exhaust gas passage forming part (4) includes: a first plate member (41) having an annular first plate part (43); and a second plate member (42) having an annular second plate part (45) which defines the exhaust gas passage (40) between the first plate part (43) and the second plate part (45), the second plate part (45) being disposed closer to a turbine outlet than the first plate part (43) in an axial direction of the turbine rotor (21). The first plate member (41) has, in a hub-side passage surface (44) of the first plate part (43) facing the exhaust gas passage (40), at least one groove portion (7) extending from an inner peripheral edge (431) of the first plate part (43) toward an outer peripheral side.

With the above configuration 1), since the groove portion (7) formed in the hub-side passage surface (44) extends from the inner peripheral edge (431) of the first plate part (43) toward the outer peripheral side, the exhaust gas entering the groove portion (7) can be guided directly to the turbine rotor (21) from inside the groove portion (7). The exhaust gas flowing in the groove portion (7) is guided by the wall surface (first wall surface 71) of the groove portion (7), which modifies the inflow angle into the turbine rotor (21) to an angle along the wall surface. As a result, the inflow angle (inclination angle with respect to the radial direction) of exhaust gas flowing on the hub side toward the leading edge (213) of the turbine rotor (21) at low flow rates can be maintained at a predetermined angle (fixed value a). By maintaining the inflow angle at a predetermined angle, it is possible to reduce the vortex flow generated near the hub (211) of the turbine rotor (21) on the leading edge (213) side at low flow rates. By reducing the vortex flow, it is possible to reduce the loss of the turbine rotor (21) due to the vortex flow. As a result, it is possible to improve the efficiency of the turbine (2) at low flow rates.

2) In some embodiments, in the variable geometry turbine (2) described in 1), the at least one groove portion (7) includes a first wall surface (71) connecting an outer peripheral end (74) of the groove portion (7) to a downstream end (711) of the groove portion (7) on the inner peripheral edge (431) located downstream of the outer peripheral end (74) in a rotational direction of the turbine rotor (21).

With the above configuration 2), the exhaust gas flowing in the groove portion (7) is guided by the first wall surface (71) and is modified to an angle along the first wall surface (71). With the first wall surface (71), the inflow angle (inclination angle with respect to the radial direction) of exhaust gas flowing on the hub side toward the leading edge (213) of the turbine rotor (21) at low flow rates can be maintained at a predetermined angle (fixed value a). Since the first wall surface (71) connects the outer peripheral end (74) of the groove portion (7) to the downstream end (711) of the groove portion (7) on the inner peripheral edge (431), the flow direction of exhaust gas can be modified without much obstruction to the flow of exhaust gas in the groove portion (7).

3) In some embodiments, in the variable geometry turbine (2) described in 2), in plan view perpendicular to an axis of the turbine rotor (21), the first wall surface (71) includes a convex surface (71A) protruding downstream in the rotational direction with respect to an imaginary line (IL) linearly connecting the outer peripheral end (74) of the groove portion (7) to the downstream end (711) on the inner peripheral edge (431).

With the above configuration 3), since the first wall surface (71) includes the convex surface (71A) protruding downstream in the rotational direction of the turbine rotor (21), the exhaust gas flowing in the groove portion (7) can be gently guided. This prevents the exhaust gas from separating from the first wall surface (71), thus modifying the flow direction of exhaust gas without much obstruction to the flow of exhaust gas by the first wall surface (71).

4) In some embodiments, in the variable geometry turbine (2) described in 3), the convex surface (71A) is inclined such that an inclination angle of a tangent line (U) of the convex surface (71A) with respect to a radial direction of the turbine rotor (21) in plan view perpendicular to the axis of the turbine rotor (21) decreases toward the downstream end (711).

With the above configuration 4), since the convex surface (71A) is inclined such that the inclination angle of the tangent line (U) of the convex surface (71A) with respect to the radial direction of the turbine rotor (21) in plan view perpendicular to the axis of the turbine rotor (21) decreases toward the downstream end, the inflow angle (inclination angle with respect to the radial direction) of exhaust gas flowing along the convex surface (71A) into the turbine rotor (21) can be modified to be small, while preventing the exhaust gas from separating from the convex surface (71A).

5) In some embodiments, in the variable geometry turbine (2) described in any one of 2) to 4), the plurality of nozzle vanes (6) includes a downstream nozzle vane (6B) that is adjacent to the at least one groove portion (7) on a downstream side in the rotational direction of the turbine rotor (21). In plan view perpendicular to the axis of the turbine rotor (21), the hub-side passage surface (44) of the first plate member (41) has a region (A1) where the groove portion (7) is not formed between the first wall surface (71) of the groove portion (7) and a rotating range (RA1) of the downstream nozzle vane (6B) in the rotational direction of the turbine rotor (21).

With the above configuration 5), since the hub-side passage surface (44) has the region (A1) where the groove portion (7) is not formed between the first wall surface (71) and the rotating range (RA1) of the downstream nozzle vane (6B), it is possible to suppress an increase in clearance between the hub-side passage surface (44) and the hub-side end (61) of the downstream nozzle vane (6B) due to the groove portion (7), suppressing an increase in exhaust gas flow loss due to the increased clearance. Additionally, when the plain hub-side passage surface (44) has the region (A1) where the groove portion (7) is not formed between the first wall surface (71) and the rotating range (RA1) of the downstream nozzle vane (6B), it is possible to increase the degree of freedom in the shape of the first wall surface (71) since the rotating range (RA1) of the downstream nozzle vane (6B) does not need to be considered when setting the shape of the first wall surface (71).

6) In some embodiments, in the variable geometry turbine (2) described in any one of 2) to 5), the at least one groove portion (7) further includes a second wall surface (72) connecting the outer peripheral end (74) of the groove portion (7) to an upstream end (721) of the groove portion (7) on the inner peripheral edge (431) located upstream of the outer peripheral end (74) in the rotational direction of the turbine rotor (21).

With the above configuration 6), the groove portion (7) includes the first wall surface (71) connecting the outer peripheral end (74) of the groove portion (7) to the downstream end (711) of the groove portion (7) on the inner peripheral edge (431), and the second wall surface (72) connecting the outer peripheral end (74) of the groove portion (7) to the upstream end (721) of the groove portion (7) on the inner peripheral edge (431). In this case, the area (projected area) of the groove portion (7) in plan view perpendicular to the axis of the turbine rotor (21) can be large, allowing a large amount of exhaust gas to flow into the groove portion (7). In this case, the flow direction of a large amount of exhaust gas in the groove portion (7) can be modified by the plain groove portion (7), so that the flow of exhaust gas flowing on the hub side at low flow rates can be effectively modified.

7) In some embodiments, in the variable geometry turbine (2) described in 6), the plurality of nozzle vanes (6) includes an upstream nozzle vane (6A) that is adjacent to the at least one groove portion (7) on an upstream side in the rotational direction of the turbine rotor (21). In plan view perpendicular to the axis of the turbine rotor (21), the hub-side passage surface (44) of the first plate member (41) has a region (A2) where the groove portion (7) is not formed between the second wall surface (72) of the groove portion (7) and a rotating range (RA2) of the upstream nozzle vane (6A) in the rotational direction of the turbine rotor (21).

With the above configuration 7), since the hub-side passage surface (44) has the region (A2) where the groove portion (7) is not formed between the second wall surface (72) and the rotating range (RA2) of the upstream nozzle vane (6A), it is possible to suppress an increase in clearance between the hub-side passage surface (44) and the hub-side end (61) of the upstream nozzle vane (6A) due to the groove portion (7), suppressing an increase in exhaust gas flow loss due to the increased clearance.

8) In some embodiments, in the variable geometry turbine (2) described in any one of 1) to 7), the hub-side passage surface (44) includes a flat surface (44A) extending along a radial direction of the turbine rotor (21). The at least one groove portion (7) is configured such that a depth from the flat surface (44A) increases toward an inner peripheral side of the first plate part (43).

With the above configuration 8), since the groove portion (7) is configured such that the depth from the flat surface (44A) increases toward the inner peripheral side of the first plate part (43), the exhaust gas flowing along the flat surface (44A) can easily flow into the groove portion (7). In addition, the wall surface (third wall surface 73) of the groove portion (7) gently guides the exhaust gas flowing in the groove portion (7) to the inner peripheral side and leads it to the turbine rotor (21). This suppresses turbulence in the exhaust gas flow on the hub side and in the groove portion (7) at low flow rates. Thus, it is possible to suppress a reduction in efficiency of the turbine (2) at low flow rates.

9) In some embodiments, in the variable geometry turbine (2) described in 8), in plan view perpendicular to an axis of the turbine rotor (21), the at least one groove portion (7) includes an inclined surface (73A) extending along a direction intersecting the flat surface (44A) and satisfying a condition that an inclination angle θ with respect to an imaginary extended surface (44B) extending the flat surface (44A) is 0°<θ<15°.

With the above configuration 9), if the inclination angle θ of the inclined surface (73A) with respect to the imaginary extended surface (44B) is too large, the exhaust gas may separate from the inclined surface (73A), and the inclined surface (73A) may be unable to guide the exhaust gas. By making the inclination angle θ of the inclined surface (73A) satisfy the above condition, the separation of the exhaust gas from the inclined surface (73A) can be suppressed, and the exhaust gas flowing in the groove portion (7) can be guided to the inner peripheral side by the inclined surface (73A).

10) In some embodiments, in the variable geometry turbine (2) described in any one of 1) to 9), the hub-side passage surface (44) includes a flat surface (44A) extending along a radial direction of the turbine rotor (21). The at least one groove portion (7) is configured to satisfy a condition of 0<T1≤0.2 T, where T is a thickness of the first plate part (43), and T1 is a maximum depth of the at least one groove portion (7) from the flat surface (44A).

With the above configuration 10), if the maximum depth T1 of the groove portion (7) from the flat surface (44A) is too large, the amount of exhaust gas flowing into the groove portion (7) may increase, obstructing the mainstream flow in the exhaust gas passage (40) and increasing the exhaust gas flow loss. By making the maximum depth (T1) satisfy the above condition, the obstruction of the mainstream flow in the exhaust gas passage (40) due to the groove portion (7) can be suppressed. Thus, it is possible to suppress a reduction in efficiency of the turbine (2).

11) A turbocharger (1) according to at least one embodiment of the present disclosure includes the variable geometry turbine (2) described in any one of 1) to 10), and a centrifugal compressor (3) configured to be driven by the variable geometry turbine (2).

With the above configuration 11), the vortex flow generated near the hub (211) of the turbine rotor (21) on the leading edge (213) side at low flow rates can be reduced, so that the efficiency of the variable geometry turbine (2) and the turbocharger (1) including the variable geometry turbine (2) at low flow rates can be improved.

REFERENCE SIGNS LIST

1 Turbocharger
1A Exhaust turbocharger
2 Variable geometry turbine
3 Centrifugal compressor
4 Exhaust gas passage forming part
5 Variable nozzle unit
6 Nozzle vane
6A Upstream nozzle vane
6B Downstream nozzle vane
7 Groove portion
10 Internal combustion engine
11 Rotational shaft
12 Bearing
13 Housing
14 Bearing housing
15 Gas line
16 Exhaust gas line
17 Interior space
21 Turbine rotor
22 Turbine housing
23 Exhaust gas introduction port
24 Exhaust gas discharge port
25 Scroll passage
26 Scroll passage forming part
27 Exhaust gas discharge passage
28 Exhaust gas discharge passage forming part
31 Impeller
32 Compressor housing
33 Gas introduction port
34 Gas discharge port
35 Gas introduction passage
36 Gas introduction passage forming part
37 Scroll passage
38 Scroll passage forming part
40 Exhaust gas passage
41 First plate member
42 Second plate member
43 First plate part
44 Hub-side passage surface
44A Flat surface
44B Imaginary extended surface
45 Second plate part
46 Protruding part
47 Shroud-side passage surface
48 Shroud surface
49 Nozzle support
51 Rotation mechanism part
52 Drive ring
53 Vane shaft
54 Lever plate
55 Actuator
56 Drive shaft
57 Controller
61 Hub-side end
62 Shroud-side end
71 First wall surface
71A Convex surface
72 Second wall surface
73 Third wall surface
73A Inclined surface
74 Outer peripheral end
211 Hub
212 Blade
213 Leading edge
214 Trailing edge
431 Inner peripheral edge
711 Downstream end
721 Upstream end
A1, A2 Region
IL Imaginary line
LA, LC Axis
RA1, RA2 Rotating range
RC Rotation center
RD Rotational direction
TL Tangent line
V Vortex flow
X Axial direction (of rotational shaft)
XC Compressor side
XT Turbine side
Y Radial direction (of rotational shaft)

The invention claimed is:

1. A variable geometry turbine, comprising:
a turbine rotor;
a scroll passage forming part which forms a scroll passage on an outer peripheral side of the turbine rotor;
an exhaust gas passage forming part which forms an exhaust gas passage for introducing an exhaust gas from the scroll passage to the turbine rotor; and
a variable nozzle unit for adjusting a flow of the exhaust gas in the exhaust gas passage, the variable nozzle unit including a plurality of nozzle vanes disposed in the exhaust gas passage and configured to be rotatable about respective rotation centers,
wherein the exhaust gas passage forming part includes:
a first plate member having an annular first plate part; and
a second plate member having an annular second plate part which defines the exhaust gas passage between the first plate part and the second plate part, the second plate part being disposed closer to a turbine outlet than the first plate part in an axial direction of the turbine rotor,
wherein the first plate member has, in a hub-side passage surface of the first plate part facing the exhaust gas passage, at least one groove portion extending from an inner peripheral edge of the first plate part toward an outer peripheral side,
wherein the at least one groove portion includes a first wall surface connecting an outer peripheral end of the groove portion to a downstream end of the groove portion on the inner peripheral edge located downstream of the outer peripheral end in a rotational direction of the turbine rotor, and wherein, in plan view perpendicular to an axis of the turbine rotor, the first wall surface includes a convex surface protruding downstream in the rotational direction with respect to an imaginary line linearly connecting the outer peripheral end of the groove portion to the downstream end on the inner peripheral edge.

2. The variable geometry turbine according to claim 1, wherein the convex surface is inclined such that an inclination angle of a tangent line of the convex surface with respect to a radial direction of the turbine rotor in plan view perpendicular to the axis of the turbine rotor decreases toward the downstream end.

3. The variable geometry turbine according to claim 1, wherein the plurality of nozzle vanes includes a downstream nozzle vane that is adjacent to the at least one groove portion on a downstream side in the rotational direction of the turbine rotor, and
wherein, in plan view perpendicular to the axis of the turbine rotor, the hub-side passage surface of the first plate member has a region where the groove portion is not formed between the first wall surface of the groove portion and a rotating range of the downstream nozzle vane in the rotational direction of the turbine rotor.

4. The variable geometry turbine according to claim 1, wherein the at least one groove portion further includes a second wall surface connecting the outer peripheral end of the groove portion to an upstream end of the groove portion on the inner peripheral edge located upstream of the outer peripheral end in the rotational direction of the turbine rotor.

5. The variable geometry turbine according to claim 4, wherein the plurality of nozzle vanes includes an upstream nozzle vane that is adjacent to the at least one groove portion on an upstream side in the rotational direction of the turbine rotor, and
wherein, in plan view perpendicular to the axis of the turbine rotor, the hub-side passage surface of the first plate member has a region where the groove portion is not formed between the second wall surface of the groove portion and a rotating range of the upstream nozzle vane in the rotational direction of the turbine rotor.

6. A turbocharger, comprising:
the variable geometry turbine according to claim 1; and
a centrifugal compressor configured to be driven by the variable geometry turbine.

7. A variable geometry turbine, comprising:
a turbine rotor,
a scroll passage forming part which forms a scroll passage on an outer peripheral side of the turbine rotor;
an exhaust gas passage forming part which forms an exhaust gas passage for introducing an exhaust gas from the scroll passage to the turbine rotor; and
a variable nozzle unit for adjusting a flow of the exhaust gas in the exhaust gas passage, the variable nozzle unit including a plurality of nozzle vanes disposed in the exhaust gas passage and configured to be rotatable about respective rotation centers,
wherein the exhaust gas passage forming part includes:
a first plate member having an annular first plate part, and
a second plate member having an annular second plate part which defines the exhaust gas passage between the first plate part and the second plate part, the second plate part being disposed closer to a turbine outlet than the first plate part in an axial direction of the turbine rotor,
wherein the first plate member has, in a hub-side passage surface of the first plate part facing the exhaust gas passage, at least one groove portion extending from an inner peripheral edge of the first plate part toward an outer peripheral side,
wherein the hub-side passage surface includes a flat surface extending along a radial direction of the turbine rotor, and
wherein the at least one groove portion is configured such that a depth from the flat surface increases toward an inner peripheral side of the first plate part.

8. The variable geometry turbine according to claim 7, wherein, in plan view perpendicular to an axis of the turbine rotor, the at least one groove portion includes an inclined surface extending along a direction intersecting the flat surface and satisfying a condition that an inclination angle θ with respect to an imaginary extended surface extending the flat surface is 0°<θ<15°.

9. A turbocharger, comprising:
the variable geometry turbine according to claim 7; and
a centrifugal compressor configured to be driven by the variable geometry turbine.

10. A variable geometry turbine, comprising:
a turbine rotor;
a scroll passage forming part which forms a scroll passage on an outer peripheral side of the turbine rotor;
an exhaust gas passage forming part which forms an exhaust gas passage for introducing an exhaust gas from the scroll passage to the turbine rotor; and
a variable nozzle unit for adjusting a flow of the exhaust gas in the exhaust gas passage the variable nozzle unit including a plurality of nozzle vanes disposed in the exhaust gas passage and configured to be rotatable about respective rotation centers,
wherein the exhaust gas passage forming part includes:
a first plate member having an annular first plate part; and
a second plate member having an annular second plate part which defines the exhaust gas passage between the first plate part and the second plate part, the second plate part being disposed closer to a turbine outlet than the first plate part in an axial direction of the turbine rotor,
wherein the first plate member has, in a hub-side passage surface of the first plate part facing the exhaust gas passage, at least one groove portion extending from an inner peripheral edge of the first plate part toward an outer peripheral side,
wherein the hub-side passage surface includes a flat surface extending along a radial direction of the turbine rotor, and
wherein the at least one groove portion is configured to satisfy a condition of $0<T1\leq 0.2\,T$, where T is a thickness of the first plate part, and T1 is a maximum depth of the at least one groove portion from the flat surface.

11. A turbocharger, comprising:
the variable geometry turbine according to claim 10; and
a centrifugal compressor configured to be driven by the variable geometry turbine.

* * * * *